United States Patent [19]

Bershas

[11] 4,307,205

[45] Dec. 22, 1981

[54] POLYESTER POLYOLS

[75] Inventor: James P. Bershas, Newark, Ohio

[73] Assignee: Owens-Corning Fiberglas Corporation, Toledo, Ohio

[21] Appl. No.: 218,880

[22] Filed: Dec. 22, 1980

Related U.S. Application Data

[63] Continuation of Ser. No. 100,800, Dec. 6, 1979, abandoned.

[51] Int. Cl.[3] ........................ C08G 18/00; C08G 18/14

[52] U.S. Cl. .................................... 521/171; 521/125; 521/172; 521/902; 528/80; 528/110

[58] Field of Search ............... 521/171, 172, 125, 902; 528/110, 80

[56] References Cited

U.S. PATENT DOCUMENTS

| | | | |
|---|---|---|---|
| 3,376,272 | 4/1968 | Masters et al. | 528/110 |
| 3,376,273 | 4/1968 | Masters et al. | 528/110 |
| 3,507,820 | 4/1970 | Maeda et al. | 528/110 |
| 3,882,055 | 5/1975 | Koerner et al. | 54/180 |
| 3,919,128 | 11/1975 | Baldino et al. | 521/172 |
| 4,039,487 | 8/1977 | Kolakowski et al. | 521/172 |
| 4,237,238 | 12/1980 | De Guiseppi et al. | 521/172 |
| 4,246,365 | 1/1981 | Wiedermann | 521/172 |

*Primary Examiner*—Morton Foelak
*Attorney, Agent, or Firm*—Ronald C. Hudgens; Philip R. Cloutier

[57] ABSTRACT

The reaction products of bisphenol-A and phthalic anhydride or the brominated derivatives thereof a glycol and/or propylene glycol is employed to produce low flame spread urethane-modified isocyanurate foams.

6 Claims, No Drawings

POLYESTER POLYOLS

This is a continuation of application Ser. No. 100,800, filed Dec. 6, 1979, now abandoned.

FIELD OF THE INVENTION

This invention pertains to the production of foams.

In one of its more specific aspects, this invention pertains to preparation of polyester polyols for use in urethane-modified isocyanurate foams.

BACKGROUND OF THE INVENTION

Synthesis of aromatic backboned polyestor polyols for low flame spread and low smoke, urethane modified polyisocyanate foams is well known. Principal among the materials frequently used is bisphenol-A, a commercially available material which is highly aromatic in character and therefore can provide a product of a highly aromatic character.

There has now been discovered a bisphenol-A reaction product which can be used to produce low flame spread foams.

STATEMENT OF THE INVENTION

According to this invention there is provided a polyol produced from the reaction product of bisphenol-A and phthalic anhydride or the brominated derivative thereof, the derivative containing from one to four bromine atoms per molecule, or mixtures of phthalic anhydride and brominated derivatives thereof.

DESCRIPTION OF THE INVENTION

Two basic types of syntheses can be employed.

In the first type, bisphenol-A and phthalic anhydride are reacted in contact with a glycol and with sodium acetate or with propylene oxide to produce a polyester polyol-containing reaction product which can be used as the basic material for the production of the foam.

In the second type, bisphenol-A and phthalic anhydride and a brominated derivative thereof are reacted in contact with a glycol and with propylene oxide to produce a polyester polyol-containing reaction product which can be used as the basic material for the production of the foam.

The examples presented below illustrate the preparation of the polyols and the properties of the foams concerned in this invention.

EXAMPLE 1

This example demonstrates the preparation of the first type of polyester polyol employing sodium acetate.

Solid bisphenol-A in an amount of 19.6 parts by weight (pbw) was added during a 1 hour period to a mixture of 31.8 pbw molten phthalic anhydride and 0.31 pbw sodium acetate maintained at 160°-170° C. under a dry nitrogen gas atmosphere.

Alternately, the bisphenol-A can be charged into the reaction along with the phthalic anhydride and the sodium acetate.

The resultant mixture was mechanically stirred at 170° C. for three hours after which period 44.7 pbw of tetraethylene glycol were added in one portion. A distilling head was attached to the resin kettle in order to remove the volatile materials as the temperature was raised to 225° C. Distillate began condensing when the pot temperature reached 207° C. The temperature was held at 225° C. for 5 hours after which period the pot was cooled to 150° C. At this point, 22" Hg pressure was applied to the system. The pot temperature was then raised to 225° C. while under vacuum with an intermediate stop at 180° C. for 2 hours.

After 30 minutes at 225° C., the vacuum was removed and the acid number was determined as being 7.9. An additional portion of tetraethylene glycol, 0.6 pbw, was added to the mixture and the resultant solution was stirred for 15 hours at 225° C. The pot temperature was cooled to 190° C. and 22" Hg vacuum was reapplied. The cook was completed by heating the pot contents to 225° C. under vacuum and holding there for 20 minutes.

The acid number at this point was 1.2 as compared to a desired value of 4, maximum.

The polyol was filtered while hot and cooled to room temperature.

The polyol had a viscosity of 114,400 cps at 26° C. and had a hydroryl number of 152±5. The distillate recovered was an water-organic mixture.

When the second type of polyester polyol is produced employing propylene oxide, the following ranges of reactants can be employed.

| Material | Parts by Weight | |
|---|---|---|
| | Minimum | Maximum |
| Bisphenol - A | 22.8 | 31.9 |
| Phthalic Anhydride | 25.8 | 31.9 |
| $HO(CH_2CH_2O)_nCH_2CH_2OH$ | 13.9 | 21.0 |
| Propylene Oxide | 23.9 | 30.6 |

wherein n can have a value within the range of from 1 to 3.

The reaction product should have a viscosity within the range of from about 24,800 to about 260,000 cps at 26° C., depending upon the parts by weight and the value of n employed. The product should have a hydroxyl number within the range of from about 260 to about 370, depending upon the same factors.

EXAMPLE II

This example demonstrates the preparation of the second type of polyester polyol employing propylene oxide.

24.6 parts by weight (pbw) of bisphenol-A and 21.0 pbw of tetraethylene glycol were charged into a 3 liter kettle which was equipped with a reflux condenser, nitrogen gas bypass inlet and mechanical stirrer.

Solution took place at about 70° C. and stirring was started. The mixture was heated to 135° C. and held there for 2.5 hours. Then 30.5 pbw solid phthalic anhydride were added in portions during a 1 hour period. The solution was stirred for an additional two hours at 135° C. and then 23.9 pbw of propylene oxide were added drop-wise over a 10¾ hour period. The polyol had an acid number of 0.8.

The hot resin was then filtered and cooled to 25° C. The yield of product was 97.2 percent of theoretical. The material had a viscosity of 81,150 cps at 26° C. and a hydroxyl number of 270.

The second type of polyester polyol can also be produced employing a mixture of one or more brominated derivatives of phthalic anhydride and phthalic anhydride, preferably a mixture of tetrabromophthalic anhydride and phthalic anhydride. When the latter combination is employed, the following ranges of reactants can be employed.

| Material | Parts by Weight | |
|---|---|---|
| | Minimum | Maximum |
| Bisphenol - A | 17.2 | 20.5 |
| $HO(CH_2CH_2O)_nCH_2CH_2OH$ | 13.7 | 22.0 |
| Tetrabromophthalic anhydride | 29.2 | 33.7 |
| Phthalic Anhydride | 9.3 | 12.5 |
| Propylene Oxide | 21.9 | 22.7 |

wherein n can have a value of 1 or 3.

The reaction product should have a viscosity within the range of from about 31,400 to about 310,000 cps, depending on the parts by weight and the value of n employed. The product should have a hydroxyl number within the range of from about 230 to about 260 depending upon the same factors.

EXAMPLE III

This example demonstrates the preparation of the second type of polyester polyol employing a mixture of brominated phthalic anhydride and phthalic anhydride.

A mixture of 19.6 pbw bisphenol-A, 13.7 pbw, diethylene glycol and about 0.001 pbw of a buffer (18.6 pbw potassium acetate and 81.4 pbw diethylene glycol) were charged into a 3 liter kettle equipped as described in Example II. The mixture was heated to 130° C. and stirring was started. After a 30 minute period, 43.9 pbw of a solid mixture consisting of 75.8 weight percent tetrabromophthalic anhydride and 24.2 weight percent phthalic anhydride was added portion-wise to the hot solution over a one hour period.

The resultant liquid was stirred at 130° C. for one hour before drop-wise addition of a total of 22.8 pbw of propylene oxide was made.

The resultant product had an acid number of 0.45 and a viscosity of 310,000 cps at 23° C. and a hydroxyl number of 232.

Polyols of both types have been evaluated using appropriate isocyanurate foam test formulations. The screening criteria employed have been the Butler chimney test and weight retention test, the latter roughly correlating with Steiner E-84 tunnel flame spread. Also employed have been the two-foot tunnel test which gives an indication of the amount of smoke developed and dimensional stability tests which involves subjecting the sample to 95 percent relative humidity at 70° C. for 28 days, and a temperature of 98.3° C. for 28 days.

Polyester polyols prepared as previously described were employed to produce polyisocyanurate foams according to the usual methods for producing such foams. Formulations and tests on the resulting foams were as follows.

EXAMPLE IV

| | Parts by Weight |
|---|---|
| A side | |
| Polymethylene diisocyanate | 67.32 |
| Silicon surfactant | 0.45 |
| Blowing Agent, $CCl_3F$ | 2.00 |
| B Side | |
| Polyol as in Example II | 6.81 |
| Chlorinated polyol | 6.81 |
| Polyester fiber Waste Stream Polyol | 0.54 |
| Hydroxyl-containing epoxy resin | 2.61 |
| Silicon Surfactant | 0.44 |
| Blowing Agent, $CCl_3F$ | 10.71 |
| Potassium Acetate, diethylene glycol | 1.50 |

-continued

| | Parts by Weight |
|---|---|
| Dimethyl ethanol amine | 0.30 |

Tests were as follows:
Density: 2.06 pcf
Butler Chimney: 9.65% weight retention
28 day humidity aging: +6.9%
2 foot tunnel test: low-moderate smoke

EXAMPLE V

| | Parts by Weight |
|---|---|
| A Side | |
| Polymethylene diisocyanate | 67.03 |
| Silicon surfactant | 0.44 |
| Blowing Agent, $CCl_3F$ | 1.98 |
| B Side | |
| Polyol as in Example II | 7.01 |
| Chlorinated polyol | 7.33 |
| Polyester fiber Waste Stream Polyol | 0.56 |
| Hydroxyl-containing epoxy resin | 2.69 |
| Silicon Surfactant | 0.45 |
| Blowing Agent, $CCl_3F$ | 11.02 |
| Potassium Acetate, diethylene glycol | 1.22 |
| Dimethyl ethanol amine | 0.25 |

Tests on the product were as follows:
Density: 2.26 pcf
Butler Chimney: 96.5% weight retention
28 day humidity aging: 6.5
2 foot tunnel test: moderate smoke

EXAMPLE VI

| | Parts by Weight |
|---|---|
| A Side | |
| Polymethylene diisocyanate | 67.94 |
| Silicon surfactant | 0.45 |
| Blowing Agent, $CCl_3F$ | 2.01 |
| B Side | |
| Polyol as in Example II | 6.83 |
| Polyol as in Example III | 6.83 |
| Polyester fiber Waste Stream Polyol | 0.56 |
| Hydroxyl-containing epoxy resin | 2.62 |
| Silicon Surfactant | 0.44 |
| Blowing Agent, $CCl_3F$ | 10.73 |
| Potassium Acetate, diethylene glycol | 1.33 |
| Dimethyl ethanol amine | 0.27 |

Tests on the product were as follows:
Density 2.14 pcf
Butler Chimney: 94.2% weight retention
28 days humidity aging: 6.2%
28 days heat aging: 1.7%
2 foot tunnel test: moderate smoke

EXAMPLE VII

| | Parts by Weight |
|---|---|
| A Side | |
| Polymethylene diisocyanate | 67.96 |
| Silicon surfactant | 0.44 |
| Blowing Agent, $CCl_3F$ | 2.01 |
| B Side | |
| Polyol as in Example II | 7.71 |
| Polyester as in Example I | 7.73 |
| Hydroxyl-containing epoxy resin | 1.40 |
| Silicon Surfactant | 0.45 |
| Blowing Agent, $CCl_3F$ | 10.73 |

-continued

| | Parts by Weight |
|---|---|
| Potassium Acetate, diethylene glycol | 1.33 |
| Dimethyl ethanol amine | 0.27 |

Tests on the product were as follows:
Density: 2.33 pcf
Butler Chimney: 95.3% weight retention
17 day humidity aging: 7.2%
2 foot tunnel test: low smoke It will be seen from the above that all the polyester polyols of this invention can be employed singly or in combination with each other to produce foams having commercial acceptability.

It will be evident from the foregoing that various modifications can be made to this invention. Such, however, are considered within the scope of the invention.

I claim:

1. A polyisocyanurate foam produced by reacting an organic polyisocyanate with the reaction product of a reactive mixture comprising bisphenol-A and phthalic anhydride or a brominated derivative of said phthalic anhydride and a glycol and/or propylene oxide.

2. The foam of claim 1 in which a polyisocyanurate foam is produced by reacting an organic polyisocyanate with the reaction product of a reactive mixture comprising bisphenol-A and phthalic anhydride or a brominated derivative of said phthalic anhydride and a glycol.

3. The foam of claim 1 in which the polyisocyanurate is produced by reacting an organic polyisocyanate with the reaction product of a reactive mixture comprising bisphenol-A and phthalic anhydride or a brominated derivative of said phthalic anhydride and propylene oxide.

4. The foam of claim 1 in which said bisphenol-A is reacted in an amount within the range of from about 22.8 to about 31.9 pbw with from about 25.8 to about 31.9 pbw of said phthalic anhydride.

5. The foam of claim 1 in which said reactive mixture comprises from about 17.2 to about 20.5 pbw bisphenol-A, from about 29.2 to about 33.7 pbw of tetrabromophthalic anhydride and from about 9.3 to about 12.5 pbw phthalic anhydride.

6. The foam of claim 1 having a density between 2.1 and 2.4 pounds per cubic foot.

* * * * *

UNITED STATES PATENT AND TRADEMARK OFFICE

CERTIFICATE OF CORRECTION

PATENT NO. : 4,307,205

DATED : December 22, 1981

INVENTOR(S) : JAMES P. BERSHAS

It is certified that error appears in the above—identified patent and that said Letters Patent is hereby corrected as shown below:

Column 3, line 48 should read:

for 28 days, and a temperature of 93.3$^{o}$ C. for 28 days.

Column 3, line 59 should read:

Polymethylene diisocyanate 67.82

Column 4, line 44 should read:

Polyester fiber Waste Stream Polyol 0.55

Signed and Sealed this

*Sixth* Day of *April 1982*

[SEAL]

*Attest:*

GERALD J. MOSSINGHOFF

*Attesting Officer* *Commissioner of Patents and Trademarks*